United States Patent [19]

Groome

[11] 4,230,036
[45] Oct. 28, 1980

[54] NIP ROLL FOR TREATING WEB MATERIALS AND METHOD OF MANUFACTURING SAME

[75] Inventor: Ernest J. Groome, Covington, Va.

[73] Assignee: Clupak, Inc., New York, N.Y.

[21] Appl. No.: 676,791

[22] Filed: Apr. 14, 1976

Related U.S. Application Data

[62] Division of Ser. No. 582,105, May 3, 1975, Pat. No. 3,995,354.

[51] Int. Cl.³ .............................................. B30B 13/00
[52] U.S. Cl. ......................................... 100/35; 29/132; 100/176
[58] Field of Search .......................... 100/35, 176, 211; 29/129.5, 130, 131, 132

[56] References Cited

U.S. PATENT DOCUMENTS

| 2,569,546 | 10/1951 | Treue | 29/132 |
| 2,694,360 | 11/1954 | Kronlund | 100/176 |
| 3,866,572 | 2/1975 | Gundlach | 29/132 |

FOREIGN PATENT DOCUMENTS

382539  11/1964  Switzerland ............................ 100/176

*Primary Examiner*—Harvey C. Hornsby
*Assistant Examiner*—Timothy F. Simone

[57] ABSTRACT

A nip roll is disclosed having an inner substantially rigid cylindrical member and an outer cover member of a generally incompressible substantially resilient material positioned about the inner member with reinforcing means embedded within the outer cover member having a tensile modulus greater than the modulus of the generally incompressible resilient material. The reinforcing means are so oriented with respect to the inner member that upon positioning the roll in nipped relation with a rigid roll which is externally driven, depending upon the direction of rotation, portions of the outer cover member are displaced and recoiled at the entrance and exit to the nip to provide resulting forces on web materials passed therethrough, the forces being controllable for treating such web materials. Depending upon the direction of rotation, the web material with either be compacted or elongated. A method is disclosed for producing the inventive nip roll.

4 Claims, 11 Drawing Figures

NIP ROLL FOR TREATING WEB MATERIALS AND METHOD OF MANUFACTURING SAME

This is a division of application Ser. No. 582,105, filed May 30, 1975, U.S. Pat. No. 3,995,354.

BACKGROUND OF THE INVENTION

1. Field of the Invention

The invention pertains to rolls for treating web materials such as paper, non-woven materials and the like for compacting and elongating the same.

2. Description of the Prior Art

In certain industrial applications of paper, woven and non-woven materials which are generally provided in web form, it has been found advantageous to compact the materials so as to increase their density while simultaneously producing a soft texture and increasing their extensibility. For example, in industrial uses of paper for producing bags for packaging bulk products, the manner in which these bags are handled during shipping generally requires a material which is tough and extensible to avoid tears and the like when the bags are packed for shipment. By compacting the paper materials when it is in web form, not only is their strength and stretchability increased, but the texture is somewhat softened. In the case of web materials of woven and non-woven textile materials, compacting has been found to improve the strength, texture and extensibility in a similar manner.

Prior art devices have been developed to compact such web materials utilizing double roll compactors capable of subjecting the webs to forces within the plane of the material sufficient in magnitude and direction to compact the web within commercial specifications. Conventional double roll compactors generally include a soft rubber covered roll nipped with either a steel or cast iron roll to compact web materials passing through the nip. As will be seen in the description hereinbelow, in order to compact web materials in the plane of the web, it is necessary to provide an asymmetric displacement of an incompressible material—such as rubber—which forms part of a cover member of the nip roll. This material displacement results in recoil of the rubber at the nip exit, with the net velocity of the surface of the deformable cover which contacts the web material having sufficiently reduced across the nip so as to create a velocity and force differential across the nip and within the plane of the web sufficient to compact the material.

In the prior art is has been necessary to drive both the steel roll and a roll covered with rubber material at different rotational speeds to produce this asymmetric condition. A higher speed is necessary for the steel roll to force rubber to flow into the nip at the nip entrance and for the rubber to recoil at the exit portion of the nip to produce compaction of a web material therebetween. In practice, this necessary speed differential is generally achieved by the use of a generator to brake the speed of the rubber covered roll. In this way, power is recovered which—together with additional input power—is used to drive the steel roll. This arrangement has several inherent drawbacks, the primary disadvantages being: (1) extremely large and expensive motors, generators and electrical controls are needed to handle the power being recirculated through the compactors; (2) the compactor itself must be sufficiently substantial to accommodate this excess torque which is being recirculated; and (3) the power is lost due to the inefficiencies of the conversion. Machines of this type are generally known as "MD Compactors", the expression MD referring to the fact that the web materials move through the nip in the "Machine Direction".

U.S. Pat. No. 1,537,439 to Griffith relates to a press roll for paper making machines having a vulcanized rubber having pores providing air cells in the circumference thereof to render the same repellent so as to express the surplus water from paper stock. U.S. Pat. No. 1,973,690 to Lade relates to a calender roll which is inherently heat resisting and possesses a body and surface of such characteristics as will adapt the roll for use in calendering machines where it is desired to operate on fabric, paper and the like. The roll comprises in combination, a shaft having a roll body thereon held in compressed relation between flanges at opposite ends thereof, the body comprising superposed sections of fibrous material including degummed fibers of ramie. U.S. Pat. No. 3,362,862 to Brundige et al relates to an apparatus for supercalendering paper comprised of a vertical stack of rolls and a frame means, the stack of rolls comprising a series pf alternate hard and soft rolls mounted for rotation and held in vertical alignment and touching relationship to each other by the frame means with means provided for feeding paper to be supercalenderized into the stack of rolls and means for withdrawing the paper after it is passed through the stack. Drive means for driving the lowermost roll of the stack is provided and a substantial outer portion of the soft rolls is comprised of a polyaryl carbonate material. U.S. Pat. No. 3,447,600 to Greene relates to a construction of a roll for machinery which has a specifically elastomeric cover having an inner work region and an outer non-working region. The inner working region is perforated by generally longitudinal spiral channels in order to counteract the inability of its elastomeric mass to compress and in order to flow a cooling liquid for temperature control. The outer non-working region has a higher modulus of elasticity than the inner working region so as to sufficiently isolate the outer operation of the external surface of the roll from the inner operation of the conduits. U.S. Pat. No. 3,501,823 to Gregerson et al relates to a calender roll having a central core and a roll filling composed of discs fitting on the core and compressed together to form an essentially solid body, the discs being made of a polymeric sheet material having a biaxially oriented molecular structure. U.S. Pat. No. 3,753,276 to Reisch relates to a calender roll comprising a polymeric roll covered and adapted to be secured in frictional engagement with a rigid mandrel under static conditions which will permit relative movement between the roll and the cover under operating conditions.

None of these patents suggest a nip roll for treating web materials having a reinforced elastomer cover member so constructed as to uniquely provide asymmetric displacement of the incompressible elastomer material during nipped rotation so as to result in the desired treatment of web materials such as the roll which I have invented. Moreover, none of these patents suggest a roll which is capable of compacting, elongating, and shredding paper, woven and non-woven web materials and the like without the need for complex external differential drive means.

SUMMARY OF THE INVENTION

A nip roll for treating web materials when nipped in engaged rotational relation with a second roll which comprises an inner substantially cylindrical member constructed of a substantially rigid material having a cover member of a generally incompressible substantially resilient material positioned thereabout and secured to the outer surface portions thereof. The cover member includes reinforcing means positioned therewithin, the reinforcing means having a tensile modulus of elasticity greater than the modulus of the generally incompressible substantially resilient material, each of the reinforcing means being sloped at a generally acute angle with respect to an associated outer surface portion of the inner member such that upon positioning the roll in adjacent engaged rotational relation with the mating roll so as to create a nip therebetween, the sloping direction of the reinforcing means, combined with the greater modulus of elasticity thereof, causes relative displacement and recoil of the substantially incompressible material at the nip entrance and exit such that the speed of at least surface portions of the substantially incompressible material on the incoming side of the nip to differ from the speed of at least surface portions of the substantially incompressible material on the outgoing side of the nip so as to provide net forces across the nip which are controllable for treating web materials and the like in a desired manner.

In the preferred embodiment the cover member of the nip roll is constructed of an elastomeric material with either fiber/rubber composite materials or woven polyester textile fabric sections forming reinforcement cords, and is so structured and configured such that when the roll is nipped in engaged relation with an externally rotated steel or cast iron roll which is substantially rigid as compared to the present nip roll, the displacement of the elastomeric material of the cover member of the inventive roll will be sufficiently asymmetric such that upon passing a web of paper material for example, through the nip the resultant of the forces acting on the web material within the plane thereof by the roll members provide compaction of the material thereby rendering it softer and considerably more extensible than uncompacted material. The elastomeric material may comprise either a synthetic or natural rubber material.

Thus, as will be seen from the description which will follow, the present inventive roll is capable of creating the net forces within the plane of the web materials without the need for complex external driving means and devices as is generally required to produce such forces with prior art rolls. Moreover by providing reinforcing members in the form of sections of woven polyester textile fabric embedded within the rubber cover member and by drivingly rotating the rigid roll in a direction such that the reinforcing fabric sections approach an approximately parallel alignment with the web material within the nip as they approach the nip zone, the net forces acting on the web material will be substantially compressive within the plane of the web material.

In the preferred embodiment, it has been found that exemplary results are obtained when the cover member is formed of laminations of synthetic rubber material having interposed therebetween, fiber rubber composite materials or layers of fabric sections of woven textile polyester, the laminations being suitably secured to each other prior to curing of the rubber material by a suitable cement solution. The preferred embodiment of the roll will further include an outer layer of unreinforced rubber material which will provide a continuous outer surface of the roll and absorb any minor discontinuities caused by the fact that the cover member is formed of separate laminations of the rubber material. In addition, it has also been found to be preferable to include at least two layers of unreinforced rubber material disposed about the inner substantially rigid cylinder member and between the member and the primary cover member, each of the inner rubber layers being of a progressively lower rubber hardness from the inner member toward the outer surface so as to provide a gradual decreasing hardness in the material of the components forming the roll from the inner core to the outermost cover member.

For the purpose of the present description, I refer to the "hardness rating" of the elastomer material as that parameter which provides a measure of hardness of rubber materials and the like as measured on a Shore Scleroscope, A Scale. In the preferred embodiment of the present invention, the specific hardness ratings of the elements of the inventive roll have been sought to be optimized and it should be understood that such hardness ratings are relative and are not contemplated as prerequisite to the precise practice of the invention, but only to the preferred embodiments. Further, it should be understood that any suitable or conventional rubber hardness parameters which are equivalent to the approximate hardness ratings recited herein may also be used as a guide in the practice of the invention.

For paper webs it has been found that with a moisture content up to 30-40% as calculated by the following formula:

$$\% \text{ moisture} = \frac{\text{total weight of water}}{\text{weight fiber} + \text{weight of water}}$$

the paper web is suitably compacted utilizing the preferred embodiment of the invention which includes an apparatus having a roll with a reinforced cover member. However, for paper webs having relatively high moisture content according to the above relation—say 50-60%—it has been found that friction forces are sufficiently reduced such that the asymmetric configuration and displacement of the elastomer cover material during rotation of the rolls not only does not adequately compact the web materials but in fact causes scuffing and gouging of the paper web. By positioning two rolls constructed according to the present invention in nipped rotational engagement with each other, slip forces between the rolls and the web materials should be substantially eliminated by the provision of substantially identical compacting forces on each side of the web material. The resultant force pattern on each side of the web is substantially a mirror image of the forces on the opposite side. This inventive arrangement—while admittedly providing less compaction of paper web materials than that of the preferred embodiment—nevertheless should provide adequate compaction of relatively low friction web materials without gouging or scuffing of the paper surfaces. According to this arrangement the inventive roll, having a reinforced cover member, is nipped in driving rotation with an identical roll and rotated such that the sloped reinforcing members—within the elastomer cover member—approach a parallel orientation with a web material passing through the nip of the rolls.

An additional feature of the roll of the present invention pertains to its ability to elongate web materials when it is nipped for rotation with a substantially rigid roll which is drivingly rotated in a direction opposite to the direction of the roll of the preferred embodiment. It will be seen from the detailed description which follows that this rotation is such that the sloped reinforcing members embedded within the elastomer cover member of the inventive roll rotationally approach the web material in an orientation which is approximately perpendicular to the plane of the web material. This arrangement causes displacement of the elastomer material toward the entrance to the nip and provides recoil forces of the displaced elastomer material at the nip exit, which forces are in the direction of movement of the web thus causing elongation thereof due to the increases in the velocity of the elastomer material from the input to the output of the nip. Web materials such as paper having a lower tensile strength cannot withstand the elongation forces and the net result is that the paper material is conveniently torn or shredded due to the progressive tearing of strips of material lengthwise of the roll. Thus the present roll may comprise a useful part of a paper shredding apparatus.

A method is disclosed for producing forces in the plane of web materials such as paper for treating the materials comprising creating a nip between two members, at least one member being a substantially cylindrical rotatably mounted roll having an inner roll core and an outer cover member constructed predominently of a substantially incompressible generally resilient material and passing the web material through the nip. The method further comprises structuring the outer cover member of the roll in a manner such that the nip forces thereon displace portions of the generally resilient material asymmetrically about the nip such that material displaced in a first direction on one side of the nip recoils on the other side of the nip to substantially its original position to the inner roll core thereby providing an asymmetrical pattern of nip forces on the web materials as they pass through the nip. According to the preferred practice, the method comprises providing at least two rolls, one of which is preferably a generally rigid roll with the rolls being positioned in adjacent nipped rotational relation. Preferably the method also resides in providing reinforcing members embedded within the substantially incompressible material, the reinforcing members having a modulus of elasticity greater than the substantially incompressible material of the outer cover member and these members are positioned and configured in relation to the direction of rotation of the rolls such that the generally incompressible material is displaced toward the outgoing side of the nip. By continued rotation of the rolls with the web material nipped therebetween, as the web material leaves the influence of the nip, the displaced generally incompressible material recoils toward its original position relative to the inner roll core such that the speed of the surface portions of the material at the outgoing side of the nip is actually less than the speed of the corresponding surface portions entering the nip causing an asymmetric force pattern on the web materials within the plane thereof, and across the nip.

The invention also pertains to a new and useful method of producing the inventive nip roll disclosed herein which comprises taking a substantially cylindrical member constructed of a substantially rigid material; securing successive strips of substantially incompressible and resilient elastomer material along the length of the roll in a manner such that the strip has an arcuate configuration and extends generally at an acute angle to a plane tangent to the rigid cylindrical roll passing through the line of contact between the strip of elastomer material and the cylindrical roll, the arcuate configuration being such that the angle formed between the strip of elastomer material and the tangent plane is greater than the corresponding angle at the free end portion of the strip of elastomer material; laminating a section of reinforcing fabric on the elastomer section so as to cause the fabric to assume the arcuate configuration of the elastomer material section; repeating the steps of alternatingly laminating elastomer sections identically configured to the first elastomer section sufficiently to produce a fabric reinforced elastomer cover substantially surrounding the entire peripheral surface portions of the cylindrical roll; placing the entire reinforcing elastomer covered roll in an air impervious enclosure; drawing a vacuum in the air impervious enclosure; and subjecting the covered roll to a curing process to at least partially soften the elastomer material and thereafter causing it to become cured to thereby form a substantially uniform continuous circular cover member having a cross-section of alternating arcuate elastomer sections with arcuate alternating reinforcing fabric sections therebetween. Preferably the method utilizes a profile rolling means which is rolled over each strip of elastomer material after the step of securing the strip to the previous strip of reinforcing fabric while simultaneously applying a downward pressure thereto sufficient to force the contacting surfaces of elastomer material strips and reinforcing fabric in full contact with each other.

BRIEF DESCRIPTION OF THE DRAWINGS

Preferred embodiments of the invention are described hereinbelow with reference to the drawings wherein.

DESCRIPTION OF THE PREFERRED EMBODIMENTS

Figures 1A, 2A:
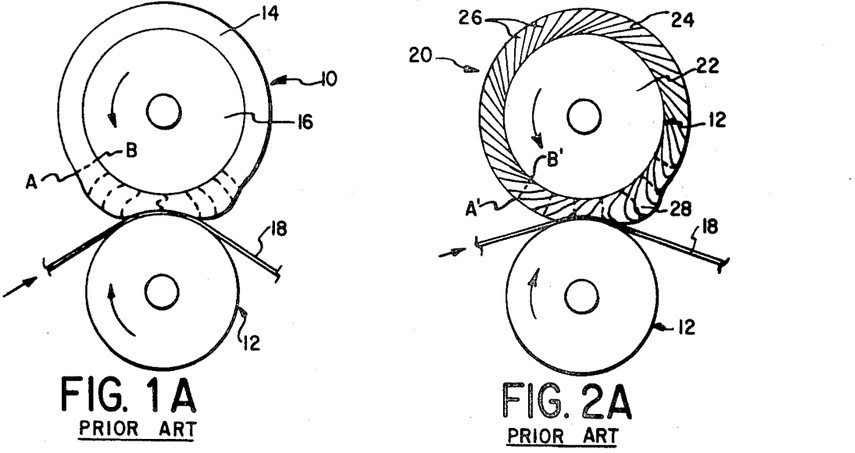
FIG. 1A is a cross-sectional view of a covered nip roll according to the prior art forming a nip with a conventional rigid roll.
FIG. 2A is a cross-sectional view of a nip roll having a reinforced cover member according to the present invention and forming a nip with a conventional rigid roll.

Referring initially to FIG. 1A there is illustrated a cross-sectional view of a conventional unreinforced rubber-covered roll 10 nipped with a conventional steel roll 12. The cover 14, being of rubber, is thus resilient and incompressible and therefore displaced from the nip area symmetrically as shown to form a hump at both the nip exit and the nip entrance. The displacement of rubber material is represented from section to section by the dotted lines shown in FIG. 1A. When the rolls are rotated in the direction illustrated, the tangential displacement "D" versus time "T" of a point A on the surface of the rubber with respect to point B radially therebeneath on the surface of the core 16 will be as shown in FIG. 1B.

Figure 1B:
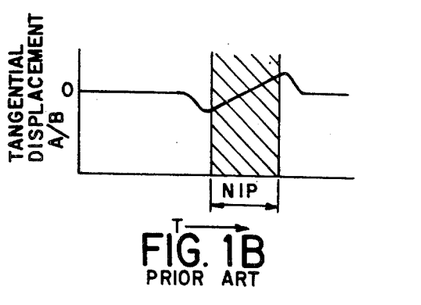
FIG. 1B is a displacement diagram of a point A on the surface of the covered roll of FIG. 1A with respect to a point B, radially beneath point A, and on the surface of the inner core.

From the displacement diagram of FIG. 1B, the tangential velocity "V" versus time "T" may be easily derived according to the following equation:

$$\text{Velocity} = V = dD/dT$$

where d/dt represents the first derivative of distance "D" with respect to time "T".

Figure 1C:
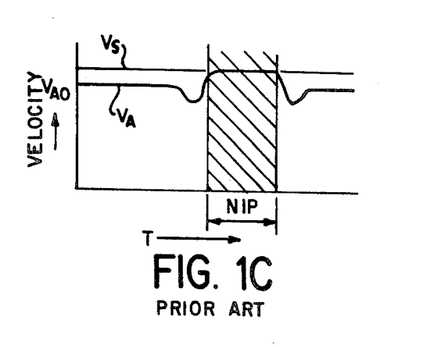
FIG. 1C is a velocity diagram derived from FIG. 1B.

The velocity diagram for the prior art roll 10 is illustrated in FIG. 1C. As can be seen from this diagram, the velocity of the point A will assume a value $V_{Ao}$ which is less than $V_S$, the velocity of the steel roll 12. As a point A approaches the hump of the nip, its velocity will be momentarily reduced—due to rubber displacement—and then accelerated to the velocity of the steel roll as it enters the nip. Friction forces will maintain the velocity of the rubber surface substantially equal to the steel roll velocity throughout the nip range. After passing through the nip, the velocity of point A will again decrease to below its normal velocity $V_A$ and as point A continues to rotate away from the influence of the nip, its velocity increases to its original value, $V_{Ao}$. Thus the rubber surface enters and leaves the nip at substantially the same velocity and has the same speed as the surface of the steel roll 12, and a web material 10 will neither be compacted nor elongated while passing through the rolls. Consequently, in order to compact web materials with the apparatus of FIG. 1A, it is necessary to employ complex devices to provide differential speeds to the rolls so as to create an asymmetric nip.

Referring now to FIG. 2A, there is illustrated a roll 20 constructed according to the invention. An inner core 22 is preferably in the form of a cylindrical steel roll 13 having a cover 24 of a rubber material with reinforcing cord materials 26 positioned at a generally acute angle with respect to the line of contact with the associated outer surface portion of the inner core 22. Steel roll 12 which is nipped for rotation with the inventive roll 20, is driven externally by conventional means not shown in the drawings.

Reinforcing cords 26 have a modulus of elasticity defined as:

$$E = \text{Stress/Strain}$$

which is greater than the modulus of the basic rubber material forming the cover. Such reinforcing materials may be of woven or non-woven materials such as polyester, nylon, cotton and the like, preferably with the direction of greatest modulus extending in the general direction of movement of the web materials. In addition, such reinforcing means as fiber/rubber composite materials oriented so as to reinforce the cover member are also contemplated. However, it is preferred that the woven reinforcing materials are of a woven polyester textile fabric of even mesh, positioned with the weft threads generally in the direction of the machine. The warp threads will thus extend lengthwise of the roll.

Figure 2B:
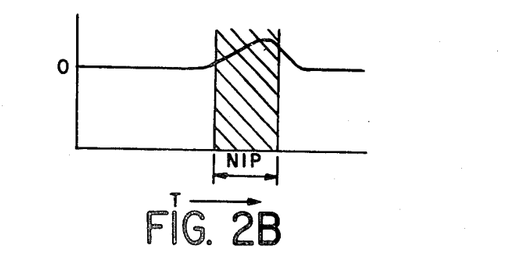
FIG. 2B is a displacement diagram of a point A' on the surface of the covered roll of FIG. 2A with respect to a point B' radially beneath point A', and on the surface of the inner core.

Referring once again to FIG. 2A, it can be seen that when the rolls 20 and 12 are rotated in the direction shown, the reinforcing cords 26 will resist elongation and prevent rubber displacement from occurring toward the ingoing side of the nip, while offering little resistance to bending as caused by the nip forces on the outgoing side of the nip. Thus, a point A' on the cover member 24 is displaced as illustrated by the dotted lines of FIG. 2A and the tangential displacement of a point A' relative to a point B' radially therebeneath (on the surface of the inner steel core 22) will be as shown in FIG. 2B. It can be seen that because all the rubber displacement is in one direction (as shown in the shifted portion 28 of FIG. 2A), the stresses on the rubber causing this displacement will increase to substantial levels.

Figure 2C:
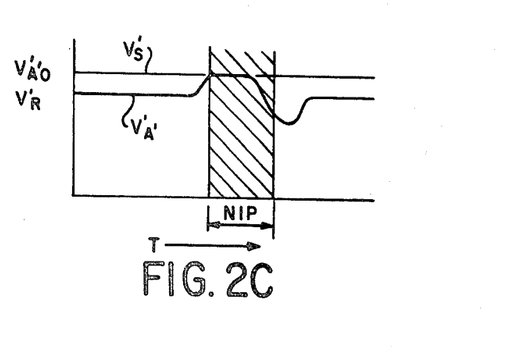
FIG. 2C is a velocity diagram derived from FIG. 2B.

With continued rotation, the forces caused by these stresses become greater than the friction forces between the roll surface and when the cover 24 is relieved of the influence of the nip, the displaced rubber portion will recoil toward its original position relative to the inner core as represented in the velocity diagram of FIG. 2C. Thus, point A' on the outer surface of the roll cover 24, will have a velocity profile relative to the point B' on the outer surface of the inner core 22 as shown in FIG. 2C. The velocity $V'_A$ of point A' will have an initial value $V'_{A'o}$ and will be accelerated into the nip to a value $V'_S$—the velocity of the steel roll. No deceleration of point A' occurs prior to the nip since no displacement of rubber material is permitted by the reinforcing cords 26, particularly because of their high modulus and their particular orientation with respect to the natural flow tendencies of the incompressible rubber material.

Within the nip, the velocities of point A' and the corresponding point on the steel roll are substantially equal and constant until a rotational position is reached where the rubber recoil forces overcome the friction forces between the surfaces. At this point the recoil action of the rubber material returning to its original position on the roll will cause the velocity $V'_A$ to decrease rapidly through some minimum value $V'_R$. Thereafter it assumes its original value $V'_{A'o}$ away from the nip influence.

It can be seen particularly from the velocity profile of point A' that the rubber surface enters the nip with a considerably greater velocity than that with which it leaves the nip. Since a web 18 of paper (or woven or non-woven textile materials) will tend to follow the rubber velocity through the nip region, the paper, like the rubber, will leave the nip at a lower speed than that at which it enters the nip. This difference in speed is a measure of the web shrinkage. The improved compaction is particularly due to the asymmetric displacement of rubber caused by the higher modulus reinforcing cords and the particular sloped orientation of the reinforcing cords relative to the direction of rotation of the roll 20.

Figure 3:
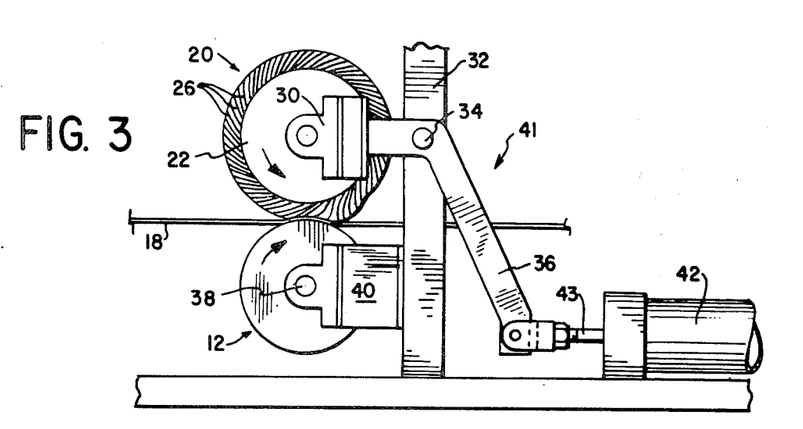
FIG. 3 is a side elevational view of a compacting apparatus utilizing the nip roll of the present invention for compacting web materials.

Referring now to FIG. 3, the compaction roll of the present invention is illustrated as an operational component of a compacting apparatus 41. The roll 20 of FIG. 2A is rotatably mounted on brackets 30 (only one side illustrated) which are pivotally supported on vertical supports 32 by pivot pin 34 and brackets 36. A rigid roll 12 preferably of either steel or cast iron, is rotatably supported by axle 38 on brackets 40 mounted on vertical frame members 32. The steel roll is rotatably driven in the direction shown by an external rotational drive mechanism (not shown).

A nip is created between the roll 20 and the steel roll 12 when roll 20 is positioned in surface to surface engagement with the steel roll 12. The force of the nip is dependent upon the percentage of actual compression of the rubber cover which in turn is dependent upon the downward force on roll 20 transmitted by the bracket 36 which converts linear forces of piston rod 43 of air cylinder 42 to rotational force moments (Force X Distance). Thus the nip forces—measured in pounds per linear inch of roll (pli)—are governed by the percentage of nip interference (or compression of the rubber cover member), which in turn is dependent upon the linear motion of the actuator piston rod 40 and the forces provided by the actuator 42. For example, with the compacting apparatus illustrated in FIG. 3 it has been found that to obtain an acceptable degree of compaction of paper sufficient to make it extensible—or stretchable—within commercial specifications, when the inner core 22 of roll 20 is approximately 20 inches in diameter, the apparatus shown will require approximately 0.4 to 0.6 horse power per inch of roll length (or machine width) at 1000 feet per minute (fpm) rotation to produce approximately 250 to 350 pli nip load and 8 to 10 percent nip interference.

Referring to FIG. 3, in operation, when a web 18 of paper requiring compaction is passed between the roll 20 of the present invention, and the steel roll 12 as shown in FIG. 3, the reinforcing cords 26, being so structured and oriented with respect to the direction of rotation that the reinforcement cords approach the steel roll in approximately parallel relation with the material web 18 as shown in FIGS. 2 and 3, rubber displacement is asymmetric and restricted to the outgoing side of the nip of roll 20 as previously described. Recoil forces of the rubber material of the reinforced roll cover results in a velocity on the exit side of the nip less than the velocity on the incoming side, thereby resulting in compaction of web materials passing therethrough.

Although the improved roll of the present invention is useful, particularly in compacting web materials as described hereinbefore, it has been found that the above arrangement is particularly suitable for compacting paper web materials having, say 30–40 percent moisture content. Paper web materials having a relatively greater moisture content as for example, 50–60 percent moisture, have been found to be damaged at least on one surface when they are treated with the apparatus of FIG. 5. Due to the adhesion between the paper and steel roll, the paper is prevented from being compacted at the time of recoil of the rubber cover. Thus it is believed that the increased friction caused by the high moisture content of the sheet causes the rolls to subject the web material to shear forces along a plane passing centrally therethrough, which in turn tend to shear the material thereabout. The forces thus applied, being greater than the shear strength of paper, will result in scuffing, gouging, or tearing of the paper. Steel rolls having special surfaces, such as that known as a "Brame" surface, or as exemplified by U.S. Pat. Nos. 3,290,209, 3,329,562 and 3,525,787 can sometimes be used in a two-roll compactor for compacting at high moisture, but these rollers have certain inherent disadvantages, for example, the grooved roll embosses the sheet with a surface pattern which is undesirable for many uses. The Brame surface tends to be erratic in its performance and is difficult to reproduce for consistent good operation.

Figure 4:
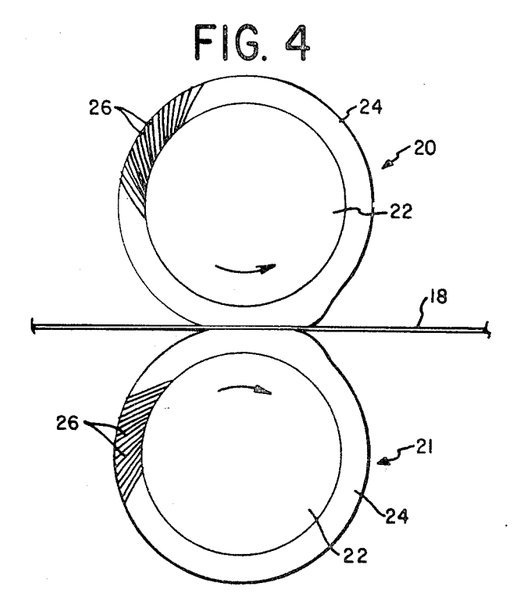
FIG. 4 is a cross-sectional view of a twin directed recoil roll illustrating an alternate embodiment of the invention.

Referring to FIG. 4 there is illustrated a twin recoil "MD" compactor apparatus which utilizes two rolls constructed according to the invention, intended for compacting paper web materials having a relatively high moisture content—up to say, 50–60 percent. A roll 20 as described hereinabove, is nipped for rotation with an identical roll 21. Either roll may be externally driven by driving means (not shown). This arrangement creates a substantially symmetrical force pattern on both surfaces of the web 18 of paper material such that when the web contains a greater than normal moisture content, no slippage or gouging of the paper should occur. The reinforcing cords 26 are oriented as described previously and rolls 20 and 21 behave identically to the roll 20 previously described with respect to the velocity profiles and rubber recoil characteristics. However, with both rolls 20 and 21 being identical, friction forces should be minimized since both rolls should nip and relieve the web material substantially simultaneously, and symmetrically about the web.

Although the arrangement of FIG. 4 is advantageous in the sense that high moisture web materials may be compacted, it has been found that the degree of compaction with this apparatus is not as substantial as that of the reinforced rubber covered roll nipped with a steel roll as described previously. For example, with the arrangement described previously, the steel roll 12, having a coefficient of friction greater than that of the inventive roll, tends to be frictionally engaged with the rubber covered roll 20 for a longer time period prior to releasing it thus resulting in greater recoil forces of the rubber material. With the twin recoil compactor arrangement of FIG. 4, the rubber material of the reinforced cover 24 will recoil to a lesser extent and compaction will be less than that of apparatus shown in FIG. 2A. Notwithstanding this disadvantage, the ability to compact high moisture materials without tearing or scuffing the surface of the web material is contemplated as a significant advance in the art.

Figure 5:
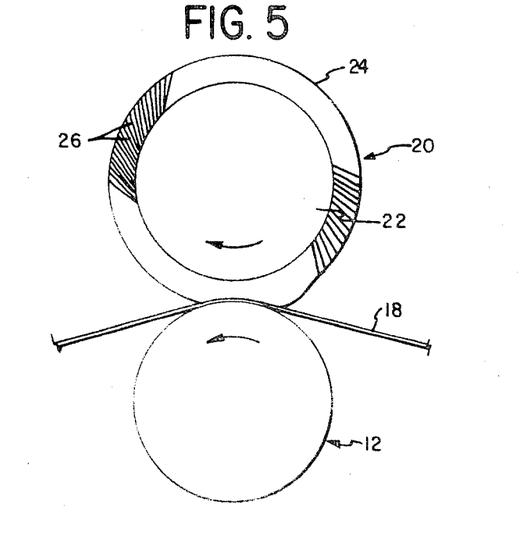
FIG. 5 is a cross-sectional view of a roll according to the present invention which is nipped with a conventional rigid roll and rotated opposite to the direction of the roll illustrated in FIG. 2A for use as a web stretching and/or shredding apparatus.

It has also been discovered that rotating the roll of the present invention in a reverse direction such that the reinforcement cords approach the web in substantially perpendicular relation thereto as shown in FIG. 5, web materials passing therethrough will be stretched in the plane of the web material. This result is caused by the peculiar displacement of rubber material resulting from the combination and relative orientation of a basically substantially incompressible elastomer material, reinforced as described previously with respect to embodiments of FIGS. 2A and 4 and rotated in a direction opposite to that described previously.

Referring to FIG. 5 there is illustrated a roll 20 as described previously, having a cover 24 with reinforcing members 26 embedded therein. An inner core 22 has a cover 24 of a generally incompressible substantially resilient rubber material. Reinforcing members 26 of woven polyester material having a tensile modulus greater than that of the rubber, are embedded within the rubber cover and oriented as shown and in accordance with the description of the previous embodiments. In addition, the reinforcing members of this embodiment may likewise be of other materials such as cotton, nylon, fiberglass, rubber, etc. It is of primary importance to slope the reinforcing members 26 at a generally acute angle with respect to the adjacent tangent plane of the inner core 44. It is also of prime significance to select reinforcing members which have a tensile modulus greater than that of the basic rubber material of the cover 47.

Referring further to FIG. 5, the roll 20 is nipped against a substantially rigid roll 12 as previously described but the direction of rotation, relative to the direction of reinforcing members 26, is as shown. As can be seen, displacement of the rubber cover 24 will be in the same general direction as the displacement of the previous embodiments but the web materials driven into the nip will enter the nip area on the side in which the rubber is displaced. The rubber material is prevented from displacement toward the outgoing side of the nip because of the resistance provided by the reinforcing members 26 in the outgoing direction. On the other hand, the reinforcing members—offering relatively less resistance in bending—provide substantially less resistance for displacement of the rubber toward the incoming side of the nip. Upon continued rotation of the rolls 20 and 12 as shown in FIG. 5, as the displaced material leaves the nip area it will return to its original position relative to the inner core 22 thereby providing forward recoil forces. Thus the velocity of a point on the surface of the reinforced cover 24 is greater on the outgoing side of the nip than the velocity on the incoming side. This force pattern elongates extensible web materials such as woven and non-woven textile webs passing through the rolls 20 and 12. In the case of paper web materials, the net elongation forces, being greater than the tensile strength of the paper, will tend to shred the paper into uniform strips. The width of the strips is dependent upon a combination of factors including the diameter of the inner core, the diameter of the reinforced rubber cover, the relative difference between the modulus of elasticity of the rubber material as compared to the modulus of elasticity of the reinforcing members, etc.

Figure 6:
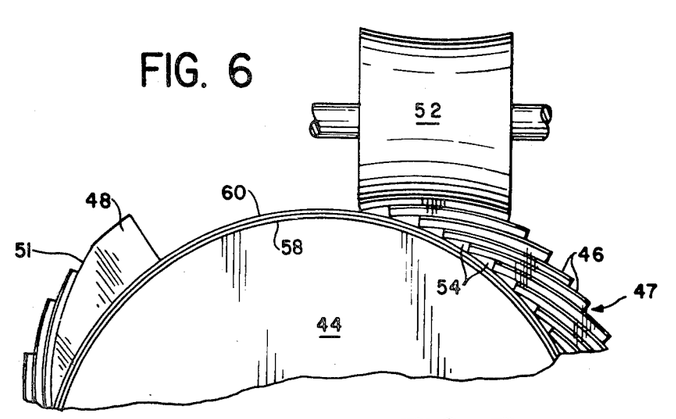
FIG. 6 is a fragmentary view of a roll of the invention illustrating the method of construction thereof.

Referring now to FIG. 6, there is illustrated the method which I have invented for manufacturing the improved compacting roll of the present invention. The roll is preferably manufactured from a steel inner core 44 which is in the form of a substantially cylindrical member as shown. Although there has been described previously a roll having a cover of a generally incompressible material with reinforcing members oriented as illustrated in the previous figures, in practice it has been found necessary to include certain specific features in the manufacture of the improved roll of the invention which are required not only to construct the roll, but to enhance its ability to perform as described. As an example which clearly illustrates the method of manufacturing the invention roll and to illustrate the relative dimensions of the components it should be noted that the steel inner roll core illustrated in FIG. 6 will be approximately 20 inches in diameter.

In FIG. 6, the steel inner core 44 has secured to its surface sufficient rubber sheets in overlaying relation with each other in the form of laminations which define a cover 47 substantially encompassing the inner core 44.

Prior to securing the rubber sheets 46 in overlapping relation with each other to the steel inner core 44, it has been found advantageous to reduce the surface hardness progressively from the surface of the inner core 40 to the outer surface of the cover 47. Thus, initially a sheet 58 of unreinforced, uncured rubber material, preferably of a rubber hardness of 90 durometer, SHORE A, is secured about a core 44 with a suitable cement. A second sheet 60 of unreinforced uncured rubber of a hardness of about 70 durometer, SHORE A, is secured to the first sheet by a suitable cement. After completion of this step, primary rubber cover 47 is then formed.

The rubber sheets 46 are preferably approximately 1/16 inch in thickness and arcuately configured as shown, to provide a cover member 47 about 2 inches radial thickness. As a result, the angle formed by these sheets with relation to an associated tangent plane of the inner core preferably decreases somewhat toward the outer surface of the cover. The effective ply thickness measured circumferentially increases from the inner core 44 toward the outer surface of the cover to compensate for the progressively increasing circumference. The actual shape of the arcuate sheet 46 required to form the configuration shown is a section of a spiral, but is approximated by an arc of a circle in the portions shown. The sheets 46—which are preferably of natural rubber of 50 durometer SHORE A hardness—are secured to each other and to the inner core 44 in overlapping relation with a suitable cement or bonding agent such as resorcinol, or a compound thereof. To initiate the proper application of the rubber layers, a profile bar 48 is positioned on the inner core as shown, with the configuration of the working surface 51 of the profile bar approximating the curvature of the strips of rubber 46 required to form a suitable roll cover 47. This bar 48 is ultimately removed before completion of the roll cover.

Each rubber sheet 46 is coated sufficiently with the cement or bonding agent and positioned in overlaping relation with the next previous sheet 46 along the length of the inner core. Upon completion of the positioning of each strip, a profile roller 52 traverses the length of the strip while simultaneously applying a downward pressure on the rubber sheet 46 thereby forcing all surfaces to contact each other. Between each sheet 46 of rubber material, a suitable reinforcing material 49, of a polyester textile fabric, is suitably cemented to the surface of the rubber sheet 46. The reinforcing cords 49 have a modulus of elasticity and a tenacity greater than that of the rubber material and are preferably constructed of woven polyester yarn of about 800 denier. The rubber sheets 46 are preferably of uncured rubber which will ultimately be cured—as will be described—when the roll cover is completed. Upon completion of the application of the rubber sheets 46, a sheet of ¼ inch unreinforced, uncured rubber material is cemented to the outer surface. This layer of material, being of 50 durometer SHORE A hardness, eliminates minor nip discontinuities in the surface of the cover which are caused by the numerous laminations of overlapping rubber sheets 46.

Figure 7:
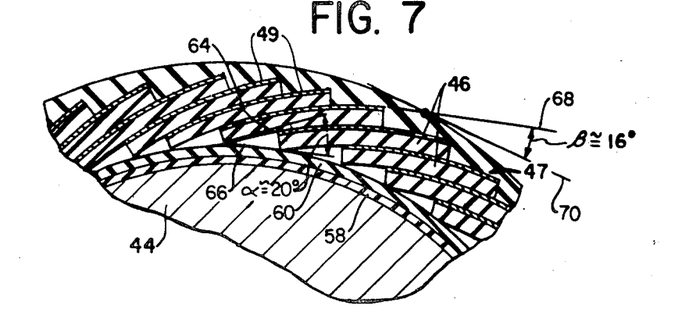
FIG. 7 is a cross-sectional view of the completed roll constructed according to the method illustrated in FIG. 6.

It can be seen that due to the particular geometry of the members assembled as shown, triangular internal spaces 54 are formed on the inner end portion of the strips adjacent the outer surface of the inner core. Upon completion of the roll cover, the roll is then enclosed within an air impermeable member such as a bag of plastic material. A vacuum is drawn within the bag to cause air to be removed from the spaces 54. Upon submitting the entire roll to a suitable curing process such as a vulcanizing process in a pressurized autoclave, while simultaneously maintaining the vacuum within the bag, some of the rubber material of the sheets 46 and some of the rubber material of inner layers 58 and 60 will flow to the adjacent spaces 54 with the result that the cover will be substantially uniform and it will have a concentric circular cross sectional configuration as shown in FIG. 7. However, although the rubber portions become generally uniform and homogeneous, the sections retain their individual character with respect to the differing rubber hardness ratings. The vulcanization of the rubber sheets also stabilizes the rubber material for use and generally improves its properties.

The diameter of the inner core 44 is determined by the individual requirements in each case. However, in the preferred embodiment, it has been found that a 20 inch diameter inner core 44 together with a roll cover 47 of approximately 2 inches thickness, provided exceptional results in treating web materials. With such an inner core, the application of the rubber layers 46 and the reinforcing materials 49 have been found to be optimized by confining the angle "α" between the plane 64 tangent to the reinforcing sheet 49 and the plane 66 tangent to the inner core at their intersection, to approximately 20° as shown in FIG. 7. The curvature of the sheet 49 is preferably defined by maintaining the corresponding angle "β" at the intersection of the sheet 49 with the outer surface portion of the roll—i.e. between the respective tangent planes 68 and 70 as shown in FIG. 7—to approximately 16°. With the preferred dimensions, as well as the preferred curvature of the rubber layers 46 and reinforcing sheets 49, the desired recoil forces, velocity profiles, and force patterns are achieved.

I claim

1. In a method of producing asymmetric forces in the plane of web materials such as paper and the like wherein the web is passed through a nip between a pair of rollers at least one of which has an inner roll core and an outer cover member predominantly of a substantially incompressible resilient material, the steps of:
    rotating one of said rolls while feeding said material longitudinally into said nip and
    restraining substantial elastic deformation of said cover member in only one circumferential direction relative to said roll core adjacent and in said nip by exerting an oblique tension force from within and to the material of said cover member, adjacent the outer surface thereof, in a direction generally tangential to said roll core on one side of said nip whereby pressure between said rollers will displace the material of said cover member toward only said one side of said nip and thereby apply asymmetrical longitudinal forces to said web on opposite sides of said nip.

2. The method of claim 1 wherein said restraining step comprises applying an oblique tension force within and to the material of said cover member, adjacent the outer surface thereof, in a direction generally tangential to said roll core.

3. The method of claim 1 wherein said restraining step is performed to restrain circumferential deformation of said cover member toward that side of said nip from which said web enters the same.

4. The method of claim 1 including the further step of terminating and restraining step after the material so restrained passes through said nip.

* * * * *